United States Patent [19]

Cheng

[11] Patent Number: 4,503,027

[45] Date of Patent: Mar. 5, 1985

[54] METHOD OF PRODUCING CARBON BLACK

[75] Inventor: Paul J. Cheng, Bartlesville, Okla.

[73] Assignee: Phillips Petroleum Company, Bartlesville, Okla.

[21] Appl. No.: 518,720

[22] Filed: Jul. 29, 1983

[51] Int. Cl.$^3$ .......................... C01B 31/02; C09C 1/48
[52] U.S. Cl. .................................... 423/450; 423/449; 422/62; 422/150
[58] Field of Search ............... 423/449, 450, 455, 456, 423/457; 422/150, 62

[56] References Cited

U.S. PATENT DOCUMENTS

| | | | |
|---|---|---|---|
| 3,005,688 | 10/1961 | Williams | 422/62 |
| 3,401,020 | 9/1968 | Kester et al. | 23/209.4 |
| 3,725,103 | 4/1973 | Jordan et al. | 106/307 |
| 3,799,788 | 3/1974 | Jordan et al. | 106/307 |
| 3,830,774 | 8/1974 | Jordan et al. | 260/42.46 |
| 3,864,305 | 2/1975 | Jordan et al. | 260/42.47 |
| 3,973,983 | 8/1976 | Jordan et al. | 106/307 |
| 4,035,336 | 7/1977 | Jordan et al. | 260/42.47 |
| 4,071,496 | 1/1978 | Kraus et al. | 260/42.36 |
| 4,228,143 | 10/1980 | Cheng et al. | 423/445 |
| 4,315,902 | 2/1982 | Dilbert | 423/456 |
| 4,339,422 | 7/1982 | Cheng | 423/456 |

*Primary Examiner*—Gregory A. Heller

[57] ABSTRACT

The tint residual of produced carbon black appears to go through a maximum value at a toluene photelometer of between about 65 and about 75. A process is disclosed for maximizing the tint residual of carbon black product at constant reactor volume and combustion gas flow by measuring the photelometer of the produced carbon black and changing the feedstock rate so that the photelometer of the carbon black being produced falls within the range of 65 to about 75.

6 Claims, 1 Drawing Figure

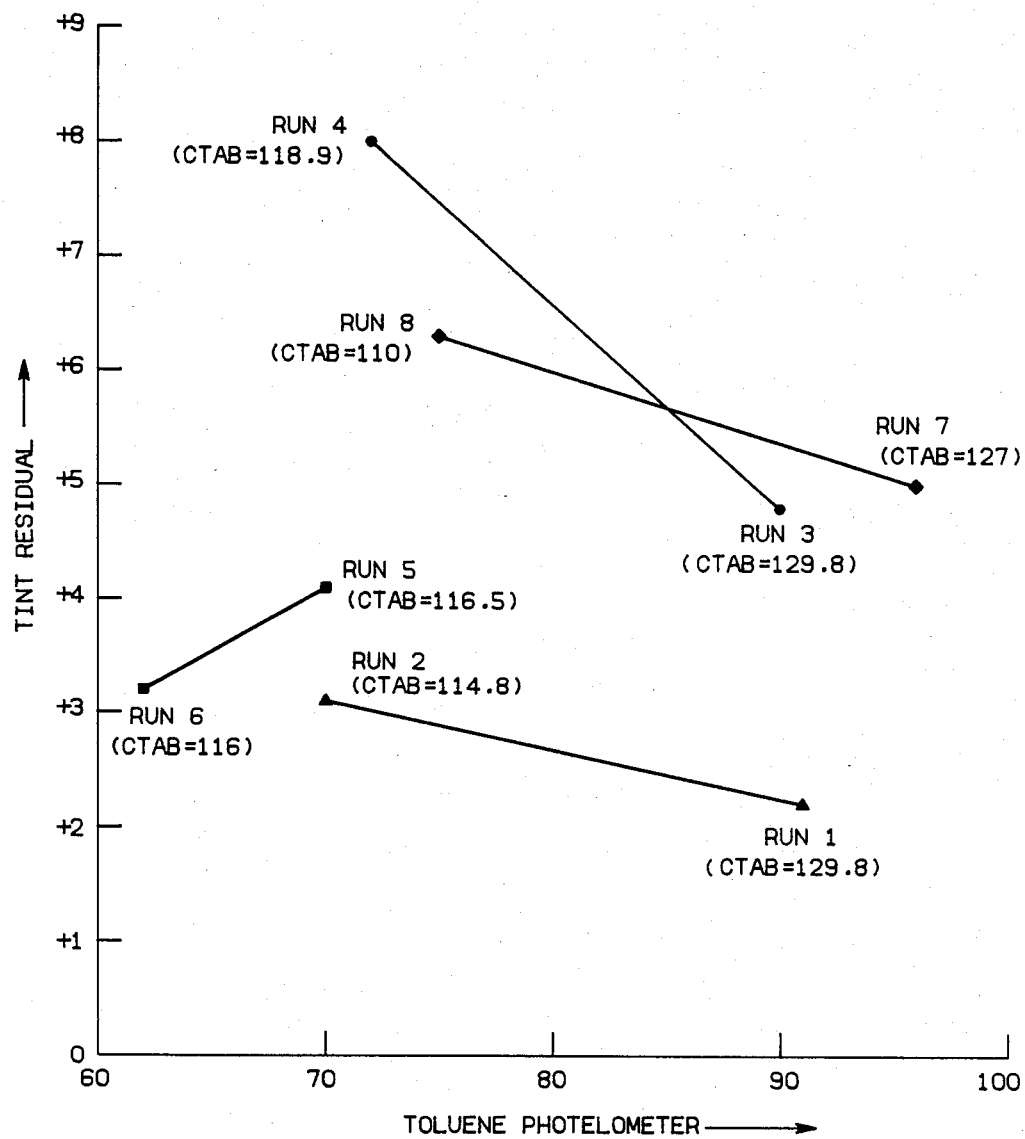

METHOD OF PRODUCING CARBON BLACK

BACKGROUND OF THE INVENTION

The present invention relates to a method for producing carbon black.

The advantages of using carbon black as a compounding agent for rubber to be used, for example, as a tire molding compound is well known. Certain types of carbon black are best used as compounding agents for tire tread compounds, and other types of carbon black are best used for compounding agents in tire carcasses. Generally speaking, it is desirable to use carbon blacks in the ASTM 100–300 series for tire treads and in the 400–700 series for carcasses. The properties of the various carbon blacks within the series can have a large influence on the properties of the desired rubber product into which the carbon black has been compounded. Some of the more important carbon black properties are structure, tinting strength, surface area, and photelometer.

Another important property of the carbon black is the tint residual. The tint residual of the carbon black sample has a marked influence on resilience, heat buildup and wear of rubber into which it has been compounded. The tint residual is the difference between the measured tint strength, T, and calculated tint, using the equation:

$$TR = T - [56.0 + 1.057\,(CTAB) - 0.002745\,(CTAB)^2 - 0.2596\,(DBP) - 0.201\,(N_2SA - CTAB)]$$

where TR is the tint residual, T is the tint strength according to ASTM 3265-80, CTAB is a specific surface area measurement of the carbon black according to ASTM D 3765-80, DPB indicates structure as per the dibutyl phthalate absorption number of a compressed sample according to ASTM D 3493-76, and $N_2SA$ is the nitrogen surface area according to ASTM 3037-76.

Another important property of the carbon black is the photelometer, also known as carbon black extractables-toluene discoloration, ASTM 1618-75. Instead of using toluene as in ASTM D 1618-75, chloroform can also be used to determine chloroform extractables or chloroform photelometer. Different values will be obtained since chloroform has a different solvency for the material on the carbon black than toluene solvency for these materials. In the chloroform "photelometer" test 2 grams of dried, loose carbon black are added to 50 milliliters of chloroform in a beaker and are admixed about 1 minute, covered with a watch glass, and allowed to stand at room temperature (about 70° F.) for about 5 minutes. The mesh is then filtered and the filtrate is measured for light transmission as in ASTM D 1618-75.

It would be desirable to maximize the tint residual for a given type or grade of carbon black. It would also be desirable to maximize yield from a carbon black reactor of this product.

OBJECTS OF THE INVENTION

The object of this invention is to produce a black using a set of reactor conditions such that optimum yield and tint residual for a given type of carbon black are achieved.

SUMMARY OF THE INVENTION

According to certain aspects of the present invention, there is provided a process for producing a tread grade carbon black in a furnace process by charging a carbonaceous feedstock and combustion gases to a carbon black reactor, measuring the photelometer of the carbon black being produced, and, where the photelometer of the carbon black is outside of the range of about 65 to 75 in toluene or 92 to 96 in chloroform, adjusting the feed rate at which carbonaceous feedstock is introduced into the reactor up or down so that the photelometer falls within said range.

BRIEF DESCRIPTION OF THE DRAWINGS

The FIGURE graphically illustrates certain principles upon which the present invention is based.

DETAILED DESCRIPTION OF THE INVENTION

The FIGURE shows that there appears to exist a relationship between carbon black photelometer and tint residual. This is surprising in view of the absence of a photelometer term in the equation for calculating the tint residual. It appears that the tint residual of the black produced goes through an optimum at a toluene photelometer of about 70. It had been thought that tint residue tended to increase with increasing surface area. However, it appears that tint residual decreases as CTAB increases and photelometer increases to above 70.

In the present invention, any suitable means for producing furnace carbon black can be employed. Preferably, the carbon black is produced in an oil furnace process. In the furnace process, a carbonaceous feedstock is contacted with combustion gases to form combustion products which contain flocculent carbon black and gases. After a given amount of reaction time under a given set of reaction conditions, the combustion products are quenched, which will fix the physical properties of the loose carbon black and form an effluent or smoke. The combustion products are quenched, for example, by contact with a quench liquid such as water or a quench fluid such as cooled reactor effluent or cooled off-gas from a separating means for carbon black and gases such as a bag filter.

In a carbon black process in which data illustrating the invention was obtained, the combustion gases were tangentially introduced into a first generally cylindrical zone of the carbon black reactor and the carbonaceous feedstock was axially introduced into the first generally cylindrical zone to form a reaction mixture with the combustion gases. The reaction mixture was passed axially from the first generally cylindrical zone and axially into the second generally cylindrical zone of smaller diameter than the first generally cylindrical zone. The carbonaceous feedstock was pyrolyzed to form a carbon black containing smoke. A quench fluid was introduced into the second generally cylindrical zone to quench the carbon black containing smoke to below pyrolysis temperatures and the carbon black thus produced was collected and a portion of it was analyzed.

When operating a carbon black reactor at a constant reactor volume by maintaining the quench at the same position, and at a constant flow of hot combustion gases, the yield of carbon black product from each gallon of feedstock can be increased by increasing the feed rate of carbonaceous feedstock. The yield increases because a smaller percentage of the feedstock is comsumed by the unreacted oxygen in the combustion gases. The specific surface area of the carbon black product decreases. The photelometer value of the black decreases. The tint residual of the produced carbon black appears to go through a maximum value at a toluene photelometer in the range of about 65 to about 75 or a chloroform photelometer of about 92 to about 96. To take advantage of this phenomenon, the invention comprises operating the carbon black reactor to produce a tread-type carbon black, measuring the photelometer of the carbon black, and adjusting the rate at which feedstock is introduced into the reactor being produced, up or down, so that the photelometer of the black is in the range of about 65 to about 75 in toluene or 92 to about 96 in chloroform. More preferably, the rate at which the carbonaceous feedstock is introduced into the carbon black reactor is adjusted up or down so that the photelometer of the carbon black is in the range of about 67 to about 73 in toluene or about 93 to about 95 in chloroform. Most preferably, the rate at which carbonaceous feedstock is introduced into the carbon black reactor is adjusted up or down so that the photelometer of the carbon black is about 70 in toluene or about 94 in chloroform.

Generally speaking, tread grade carbon blacks are carbon blacks in that ASTM N 100–N 300 series. Such carbon blacks usually have a nitrogen surface area in the range of 60–160 m$^2$/g, usually in the range of from about 90 to about 150 m$^2$/g; a CTAB surface area in the range of about 60–140 m$^2$/g, usually in the range of from about 90 to about 130 m$^2$/g, a compressed DBP value in the range of about 60–130 cm$^3$/100 g, usually in the range of from about 80 to about 110 cm$^3$/100 g, and a tint strength in the range of about 90–130, usually in the range from about 100 to about 130. The surface area of the carbon black being produced can be manipulated by changing the air to oil ratio of the reactants charged to the reactor. For example, to produce a product having a higher surface area, the carbonaceous feedstock rate could be decreased, or the combustion gas rate increased. To produce a carbon black product having a lower surface area, the carbonaceous feedstock rate could be increased or the combustion gas rate decreased. The structure of the carbon black product as measured by the DBP parameter can be increased by using a more highly aromatic feed oil. It can be decreased by using a less aromatic feed oil or by the presence of potassium in the carbon-forming zone of the reactor. The photelometer is controlled in accordance with the invention by manipulation of the carbonaceous feedstock feed rate although other means, such as manipulation of the quench position can also be employed.

The tint residual can be controlled in accordance with the invention by manipulating the feed rate of carbonaceous feedstock. It has been found that the tint residual increases with an increase in CTAB as photelometer increases from a lower value up to about 70 and also that tint residual increases with a decrease in CTAB as photelometer decreases from a higher value down to about 70. Photelometer thus appears to be a factor in the tint residual.

On a commercial basis, the invention could be best utilized to produce a carbon black by bringing the reactor on line so that the CTAB value would be in the lowest part of the range of the customer's specifications and the toluene photelometer in the range of from about 65 to about 75 for optimum carbon black yield and maximum tint residual of the carbon black product.

The invention is illustrated by the following table which sets forth data obtained from a pilot plant sized reactor. With reactor volume and combustion gas flow constant, changing from a first oil rate to a second oil rate to produce a carbon black product having a photelometer of about 70 consistently raised the tint residual of the carbon black product. The relationship between photelometer and tint residual is shown in the FIGURE. Maximum tint residual product appears to be produced at about 70 toluene photelometer.

TABLE I

| Run No. | Run Data | | | | | | | |
|---|---|---|---|---|---|---|---|---|
| | 1 | 2 | 3 | 4 | 5 | 6 | 7 | 8 |
| Air, SCF$^1$/Hr | 7,260 | 7,260 | 7,270 | 7,270 | 7,270 | 7,270 | 10,650 | 10,650 |
| Fuel, SCF/Hr | 4,140 | 4,140 | 4,130 | 4,130 | 4,190 | 4,190 | 298 | 298 |
| Btu$^2$/SCF | 97 | 97 | 106 | 106 | 71 | 71 | 2,285 | 2,285 |
| Oil, Lbs/Hr | 72.2 | 78.9 | 73.9 | 80.4 | 98.2 | 99.1 | 84.3 | 100 |
| Photelometer | 91 | 70 | 90 | 72 | 70 | 62 | 96 | 75 |
| CTAB, m$^2$/gm | 129.8 | 114.8 | 129.8 | 118.9 | 116.5 | 116 | 127.1 | 100 |
| N$_2$SA, m$^2$/gm | 143.8 | 119.2 | 142.2 | 137.4 | 118.8 | 117.8 | 145 | 115.2 |
| Compressed DBP, cc/100 gm | 90 | 90 | 95.3 | 95.2 | 98.3 | 98.1 | 96 | 99.2 |
| Tint Strength | 123 | 120 | 124.5 | 122.4 | 120 | 119 | 121 | 118.6 |
| Tint Residual | 2.2 | 3.1 | 4.8 | 8.0 | 4.1 | 3.2 | 5 | 6.3 |
| Air/Oil:(SCF/lb. oil) | 100.6 | 92.0 | 98.4 | 80.4 | 74.0 | 73.4 | 126.3 | 106.5 |
| Fuel Btu/lb. oil | 5,562 | 5,090 | 5,924 | 5,445 | 3,029 | 3,002 | 8,077 | 6,809 |

$^1$SCF = Standard Cubic Feet (1 atmosphere absolute, 60° F.)
$^2$Btu = British Thermal Unit

What is claimed is:

1. A process comprising producing a carbon black in a furnace process by charging a carbonaceous feedstock and combustion gases to a carbon black reactor, said carbon black having a nitrogen surface area in the range of 60–160 m$^2$/g, a CTAB surface area in the range of 60–140 m$^2$/g, a compressed DPB value in the range of 60–130 cm$^3$/100 g, and a tint strength in the range of 90–130, and a photelometer outside of the range of 65–75 in toluene or 92–96 in chloroform;
   measuring the photelometer of the carbon black; and
   adjusting the rate at which carbonaceous feedstock is introduced into the reactor up or down so that the photelometer of the carbon black is in the range of 65–75 in toluene or 92–96 in chloroform.

2. A process as in claim 1 wherein the rate at which carbonaceous feedstock is introduced into the carbon black reactor is adjusted up or down so that the photelometer of the carbon black is in the range of about 67–73 in toluene or about 93–95 in chloroform.

3. A process as in claim 2 wherein the measured photelometer of the carbon black is below the range of about 67–73 in toluene or about 93–95 in chloroform and the rate at which carbonaceous feedstock is introduced into the reactor is decreased.

4. A process as in claim 2 wherein the measured photelometer is above the range of about 67–73 in toluene or about 93–95 in chloroform and the rate at which carbonaceous feedstock is introduced into the reactor is increased.

5. A process as in claim 2 wherein the carbon black has a nitrogen surface area in the range of about 90 to about 150 m$^2$/g, a CTAB surface area in the range of about 90 to about 130 m$^2$/g, a compressed DBP value in the range of about 80 to about 110 cm$^3$/100 g, and a tint strength in the range of about 100 to about 130.

6. A process as in claim 2 further comprising tangentially introducing the combustion gases into a first generally cylindrical zone of the carbon black reactor;
- axially introducing the carbonaceous feedstock into the first generally cylindrical zone to form a reaction mixture with the combustion gases;
- passing the reaction mixture axially from the first generally cylindrical zone and axially into a second generally cylindrical zone of a smaller diameter than the first generally cylindrical zone;
- pyrolyzing the carbonaceous feedstock to form a carbon black-containing smoke;
- introducing a quench fluid into the second generally cylindrical zone to quench the carbon black-containing smoke to below pyrolysis temperatures; and
- collecting the carbon black thus produced.

* * * * *

UNITED STATES PATENT AND TRADEMARK OFFICE
CERTIFICATE OF CORRECTION

PATENT NO. : 4,503,027
DATED : March 5, 1985
INVENTOR(S) : Paul J. Cheng

It is certified that error appears in the above-identified patent and that said Letters Patent are hereby corrected as shown below:

Column 4, line 53

After "compressed", delete "DPB" and substitute --- DBP --- therefor.

Signed and Sealed this

Fifteenth Day of April 1986

[SEAL]

Attest:

DONALD J. QUIGG

Attesting Officer

Commissioner of Patents and Trademarks